US006263437B1

(12) United States Patent
Liao et al.

(10) Patent No.: US 6,263,437 B1
(45) Date of Patent: *Jul. 17, 2001

(54) METHOD AND APPARATUS FOR CONDUCTING CRYPTO-IGNITION PROCESSES BETWEEN THIN CLIENT DEVICES AND SERVER DEVICES OVER DATA NETWORKS

(75) Inventors: Hanqing Liao, San Ramon; Peter F. King, Half Moon Bay, both of CA (US)

(73) Assignee: Openware Systems Inc, Redwood City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/026,025

(22) Filed: Feb. 19, 1998

(51) Int. Cl.[7] ........................................................ H04L 9/00

(52) U.S. Cl. .................... 713/169; 713/170; 713/171; 713/151; 713/152; 713/153; 713/154; 713/155; 380/283; 380/284; 380/285; 705/203; 705/222; 705/228

(58) Field of Search ..................................... 380/283, 284, 380/285; 705/72, 73; 713/151–155, 169–171; 709/203, 222, 228

(56) References Cited

U.S. PATENT DOCUMENTS

| 5,416,842 | * | 5/1995 | Aziz | 380/30 |
|---|---|---|---|---|
| 5,434,918 | * | 7/1995 | Kung | 380/25 |
| 5,602,918 | * | 2/1997 | Chen | 380/21 |

(List continued on next page.)

OTHER PUBLICATIONS

"Applied Cryptography"; 2nd Ed., Bruce Schneier, Oct. 18, 1995, John Wiley & Sons, Chap. 22.*

*Primary Examiner*—Tod Swann
*Assistant Examiner*—Paul E. Callahan
(74) *Attorney, Agent, or Firm*—Joe Zheng; Dag Johansen; Alan D. Minsk (57) ABSTRACT

A crypto-ignition process is needed to establish an encrypted communication protocol between two devices connected by an insecure communication link. The present invention introduces a method of creating an identical secret key to two communicating parties is conducted between a thin device and a server computer over an insecure data network. The thin device generally has limited computing power and working memory and the server computer may communicate with a plurality of such thin devices. To ensure the security of the secret key on both sides and reduce traffic in the network, only a pair of public values is exchanged between the thin device and the server computer over the data network. Each side generates its own secret key from a self-generated private value along with the received counterpart's public value according to a commonly used key agreement protocol, such as the Diffie-Hellman key agreement protocol. To ensure that the generated secret keys are identical on both sides, a verification process is followed by exchanging a message encrypted by one of two generated secret keys. The secret keys are proved to be identical and secret when the encrypted message is successfully decrypted by the other secret key. To reduce network traffic, the verification process is piggybacked with a session request from the thin device to establish a secure and authentic communication session with the server computer. The present invention enables the automatic delivery of the secret keys, without requiring significant computing power and working memory, between each of the thin clients respectively with the server computer.

25 Claims, 6 Drawing Sheets

Microfiche Appendix Included
(2 Microfiche, 179 Pages)

U.S. PATENT DOCUMENTS

| | | | | |
|---|---|---|---|---|
| 5,638,444 | * | 6/1997 | Chou | 380/21 |
| 5,841,871 | * | 11/1998 | Pinkas | 380/25 |
| 5,850,444 | * | 12/1998 | Rune | 380/21 |
| 5,909,491 | * | 6/1999 | Luo | 380/21 |
| 5,953,424 | * | 9/1999 | Vogelessang | 380/25 |

OTHER PUBLICATIONS

Diffie, W. et al.: *Authentication and Authenticated Key Exchanges*: Designs, Codes and Cryptography, US, Kluwer Academic Publishers, Boston; vol. 2, No. 2, pp. 107–125. Jun. 1, 1992.

Menezes, A.J., Van Oorschot, P.C., Vanstone, S.A.: *Handbook of Applied Cryptography*: CR Press, US, Boca Raton, FL. pp. 397–405, 515–524, 538, 717; 1997.

Frankel, Yair et al.: *Security Issues In A CDPD Wireless Network*: IEEE Personal Communications, US, IEEE Communications society, vol. 2, No. 4, pp. 16–27, Aug. 1, 1995.

Ben–Aroya, Ishai et al.: *Differential Cryptanalysis of Lucifer*: Proceedings Of The Annual International Cryptology Conference (Crypto), DE, Berlin, Springer, vol. CNF. 13, Abstract, pp. 187–199, 1993.

* cited by examiner

METHOD AND APPARATUS FOR CONDUCTING CRYPTO-IGNITION PROCESSES BETWEEN THIN CLIENT DEVICES AND SERVER DEVICES OVER DATA NETWORKS

REFERENCE TO A "MICROFICHE APPENDIX"

Appendix A, which is a part of the present disclosure, is a microfiche appendix consisting of 2 sheets of microfiche having a total of 179 frames. The microfiche Appendix is a source code listing of one embodiment of the crypto-ignition process between a plurality of mobile devices and a server device in the present invention, which is described more completely below.

A portion of the disclosure of this patent document contains material, that includes, but are not limited to, Appendices A, B and C, which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of Invention

The invention relates to secure and authenticated data communications between client computers and server computers, and more particularly relates to methods and apparatus for conducting crypto-ignition processes between two-way interactive communication devices and server computers over data networks that may be wireless network or the Internet; wherein the two-way interactive communication devices, such as mobile devices, cellular phones, landline phones and Internet appliance controllers, have generally limited computing resources such as computing power, memory and graphical display capability.

2. Description of the Related Art

A fast-growing trend on the Internet is electronic commerce. The electronic commerce is an integrative concept designed to draw together a wide range of business support services, trading support systems for commodities, products, customized products and custom-built goods and services; ordering and logistic support systems; settlement support systems; and management information and statistical reporting systems, all via the global Internet. It is well known, however, that the Internet is a wide open, public and international network of interconnected computers and electronic devices around the world. To transact business over the Internet, companies or individuals must have an efficient, reliable and secured manner to conduct private communications among themselves. There have been many efforts in progress aimed at protecting the proprietary information travelling across the Internet, mostly for computer devices in landline networks.

One of the ongoing efforts is to use cryptographic techniques to secure a private communication session between a client computer and a server computer. The cryptographic techniques provide a way to transmit information across an insecure communication channel without disclosing the contents of the information to anyone eavesdropping on the communication channel. Using an encryption process in a cryptographic technique, one party can protect the contents of the data in transit from access by an unauthorized third party while the intended party can read the data using a corresponding decryption process. Encryption is a process of transforming a set of data into some unreadable "encrypted" form. The purpose thereof is to ensure privacy by keeping the actual contents of the information hidden from unintended recipients such as eavesdroppers that might access the encrypted data. Decryption is the reverse process of the encryption. Decryption is a process of transforming encrypted data back into some intelligible form such that the actual contents can be accessed. Both encryption and decryption require the use of some secret information, usually referred to as a "key." Depending on the type of encryption mechanism used, the same key might be used for both encryption and decryption, while for other mechanisms, the keys used for encryption and decryption might be different.

Traditional cryptographic techniques are based on the sender and receiver of a message knowing and using the same secret key: the sender uses the secret key to encrypt the message, and the receiver uses the same key, often referred to as the secret key, to decrypt the message. Thus, to keep the communication channel secure, no users other than the sender or receiver should be allowed access to the secret key. This method is known as secret-key or symmetric private-key cryptography. It should be noted that private-key cryptography requires a secure channel to transfer the private key between the sender and the receiver.

A relatively new concept of encryption known as public-key cryptography uses two different keys. In the two key public-key cryptography systems, each user has two keys: a public key that is published and a private key that is kept secret. To encrypt a message to a public key recipient user, a sender encrypts a message using the recipient's public key. The recipient then decrypts the message using his private key. Thus, secure communication can commence without having to transfer a secret key across a secure channel.

Thus, the primary advantage of the public-key cryptography is that private keys never need to be transmitted or revealed to anyone. In the secret-key cryptography, by contrast, the secret keys or information to generate them must be transmitted (either manually or through a secure communication channel). However, one known disadvantage of using the public-key cryptography for encryption is the encryption speed. Specifically, there are popular private-key encryption methods that are significantly faster than any currently available public-key encryption method. Thus, encryption speed becomes a very important factor in considering the private-key cryptography versus the public-key cryptography when a cryptographic technique is used in a secure communication session involving a thin client device with limited computing resources. The thin client device referred to is considered to be a two-way interactive communication device such as a mobile computing device, cellular phone, landline phone or an Internet appliance controller. A thin client device is generally designed small in size, light in weight, low in power consumption and as economically and portably as possible. Such thin client designs often result in very limited computing resources, for example, the computing power therein is, perhaps, typically equivalent to less than one percent of what is provided in a typical desktop or portable computer, and the memory capacity thereof is generally less than 250 kilobytes. In addition, the communication between the thin client and a landline server computer is often via a wireless network that is characterized with low bandwidth, the airtime thereof is expensively measured. Therefore the private-key cryptography is often used in the communication session between thin clients and landline computers to accommodate the speed requirement.

The distribution of the private encryption keys between two trusted communicating devices is called the crypto-ignition process. Manual delivery of private encryption keys in a secret manner can be used as one of the crypto-ignition methods, but the cost can be considerable when there are hundreds, perhaps thousands of the thin clients in communication with one landline server computer. Further the human errors and trust associated with this approach make it infeasible to use in reality. Therefore, there is a great need for a generic crypto-ignition process that allows automatic deliveries of the private keys between each of the thin clients respectively with the landline server computer.

Although key agreement protocols may be used alone for the two communicating parties to agree on secret keys on each side, the authentication thereof is not provided. Use of the key agreement protocols does not guarantee that the keys agreed upon are not attacked in any manner. Lack of the authentication in such schemes makes those agreed keys not strong enough to sustain in security for a long term. There may be solutions to modify those schemes for having the authentication in place, but it generally requires some secret information to be pre-loaded into the communicating devices, hence resulting in more transactions between a thin client device and a server computer. The additional transactions may further demand a significant increase in computing power and memory in the thin devices and increase the latency of information arrival from a server computer, which is generally undesirable. Thus, there is a further need for a crypto-ignition process that conducts the crypto-ignition process between two communicating devices using minimum computing power and memory therein

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Notation and Nomenclature

In the following detailed description of the present invention, numerous specific details are set forth in order to provide a through understanding of the present invention. However, it will become obvious to those skilled in the art that the present invention may be practiced without these specific details. In other instances, well known methods, procedures, components, and circuitry have not been described in detail to avoid obscuring aspects of the present invention.

The detailed description of the present invention in the following are presented largely in terms of procedures, steps, logic blocks, processing, and other symbolic representations that resemble of data processing devices coupled to networks. These process descriptions and representations are the means used by those experienced or skilled in the art to most effectively convey the substance of their work to others skilled in the art. The present invention is a method and apparatus for conducting a crypto-ignition process between a two-way interactive communication device with a server device over a data network. The method along with the architecture to be described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

Introduction to Diffie-Hellman Key Agreement Protocol

The Diffie-Hellman key agreement protocol, also called exponential key agreement, allows two users to exchange a secret key over an insecure medium without any prior secrets. The protocol has two system parameters p and g. Both p and g public and may be used by all the users in a system. Parameter p is a prime number and parameter g (usually called a generator) is an integer less than p, which is capable of generating every element from 1 to p-1 when multiplied by itself a certain number of times, modulo the prime p.

Suppose a party A and a party B wants to agree on a shared secret key using the Diffie-Hellman key agreement protocol. They proceed as follows: First, party A generates a random private value a and party B generates a random private value b. Then they derive their public values using parameters p and g and their private values. Party A's public value is $g^a$ mod p and Party B's public value is $g^b$ mod p. They then exchange their public values. Finally, Party A computes $k_{ab}=(g^b)^a$ mod p, and party B computes $k_{ba}=(g^a)^b$ mod p. Since $k_{ab}=k_{ba}=k$, party A and party B now have a shared secret key k. The protocol depends on the discrete logarithm problem for its security. It assumes that it is computationally infeasible to calculate the shared secret key k mod p given the two public values $g^a$ mod p and $g^b$ mod p when the prime p is sufficiently large.

The Diffie-Hellman key exchange is vulnerable to a middleman attack. In this attack, an opponent, Party X, intercepts Party A's public value and sends his own public value to P arty B. When P arty B transmits his public value, Party X substitutes it with his own and sends it to Party A. Party X and Party A thus agree on one shared key and Party X and Party B agree on another shared key . After this exchange, Party X simply decrypts any messages sent out by Party A or Party B, and then reads and possibly modifies them before re-encrypting with the appropriate key and transmitting them to the correct party. This vulnerability is due to the fact that Diffie-Hellman key exchange does not authenticate the participants.

To overcome the middleman attack, the authenticated Diffie-Hellman key agreement was introduced. The immunity is achieved by allowing the two parties to authenticate themselves to each other by the use of digital signatures. The basic idea is as follows:

Before the exchange protocol, the two parties Party A and Party B each possess a public/private key pair and a certificate for the public key. During the exchange protocol, Party A computes a signature on certain messages using her private key and sends Party B the public value $g^a$ mod p together with her signature and her public-key certificate. Party B also computes a signature using his private key and sends Party A the public value $g^a$ mod p together with her signature and her public-key certificate. Even though Party X is still able to intercept messages between Party A and Party B, she cannot forge signatures without Party A's private key and Party B's private key. Hence, the enhanced protocol defeats the middleman attack.

The Preferred Embodiment

According to the principles of the present invention, a crypto-ignition process to deliver an identical secret key to two communicating parties is conducted between a thin client device and a server computer over a data network. The thin client device generally has limited computing power and limited working memory. The server computer may communicate with a plurality of such thin client devices. To ensure the security of the secret key on both sides and reduce traffic in the network, only a pair of public values is exchanged between the thin client device and the server computer over the data network. Each side generates its own secret key from a self-generated private value along with the received counterpart's public value according to a commonly used key agreement protocol, such as the Diffie-Hellman key agreement protocol. To ensure that the generated secret keys are identical on both sides, verification processes are followed by exchanging a message encrypted by the generated client-side secret key and a manual verification of signatures generated from the two generated secret keys. The secret keys are proved to be identical when the encrypted message is successfully decrypted by the other secret key and secure when the signatures are verified. To reduce network traffic, the verification process is piggybacked with a session request from the thin device to establish a secure and authentic communication session with the server computer. The present invention enables the automatic delivery of the secret keys, without requiring significant computing power and working memory, between each of the thin clients respectively with the server computer.

Figure 1:
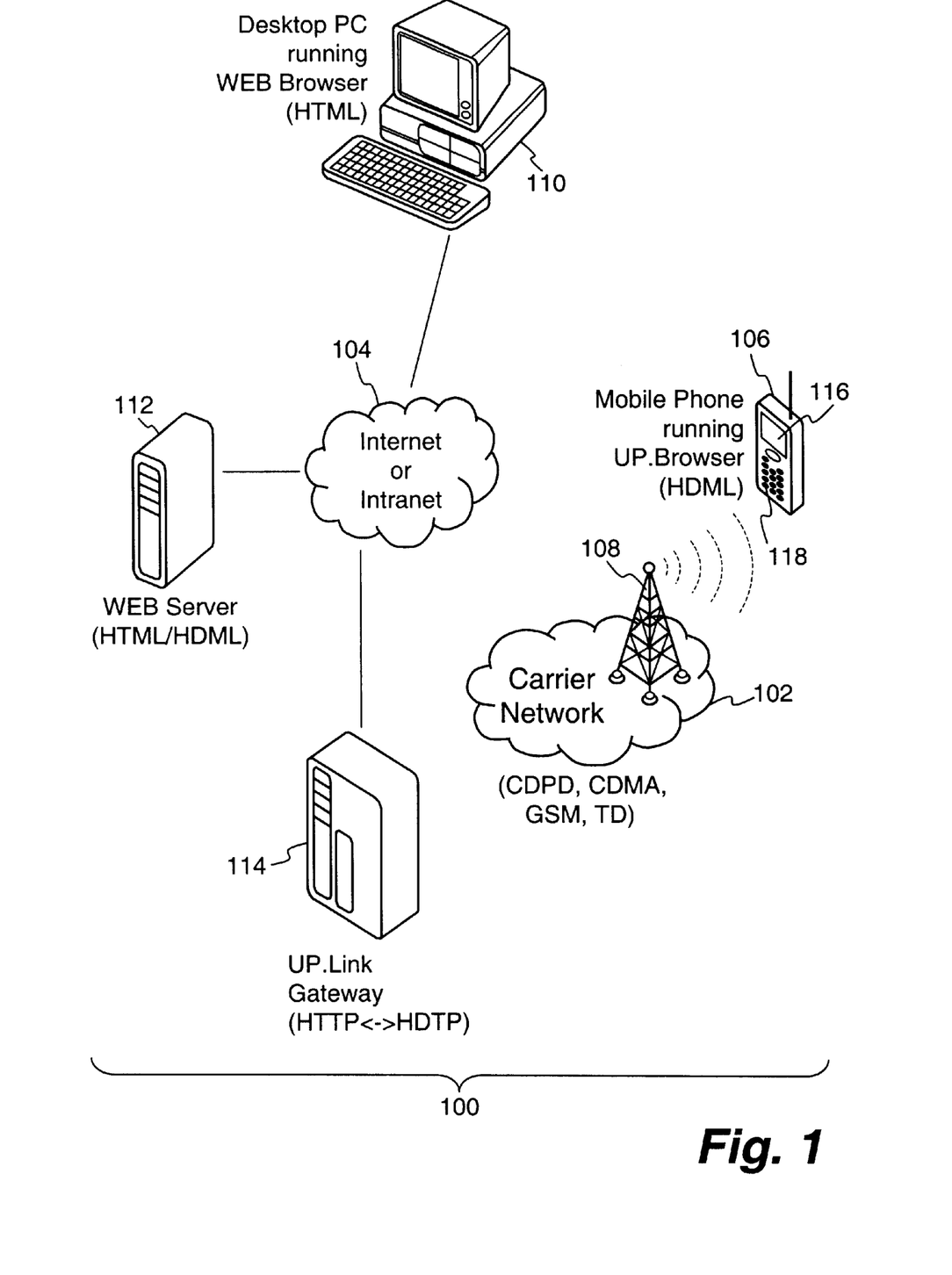
FIG. 1 shows a schematic representation of a mobile data network in which the present invention may be practiced.

Referring now to the drawings, in which like numerals refer to like parts throughout the several views. FIG. 1 shows a schematic representation of a data network 100 in which the present invention may be practiced. The data network 100 comprises an airnet 102 that is generally called wireless network and a landnet 104 that is generally a landline network, each acting as a communication medium for data transmission therethrough. The airnet 102, in which the data transmission is via the air, is sometimes referred to as a carrier network because each airnet is controlled and operated by a carrier, for example AT&T and GTE. Each carrier may have its own communication scheme, such as CDPD, CDMA, GSM and TDMA for the airnet 102. The landnet 104, used interchangeably herein, may be the global Internet, an Intranet or other private networks. Referenced by 106 is of the mobile devices that can be a mobile device, a cellular phone, a landline telephone or an Internet appliance controller, capable of communicating with the airnet 102 via an antenna 108. It is generally understood that the airnet 102 communicates simultaneously with a plurality of two-way communication devices, of which only one example mobile device 106 is shown in FIG. 1. Similarly, connected to the Internet 104 are a plurality of desktop PCs 110 and a plurality of server computers 112, though only one representative respectively shown in FIG. 1. The PC 110, as shown in the figure, may be a personal computer SPL 300 from NEC Technologies Inc. The PC 110 may execute a HyperText Markup Language (HTML) Web browser such as Netscape Navigator or Microsoft Internet Explorer to access information on the Internet 104 using HyperText Transport Protocol (HTTP). For example, the PC 110 may access HTML information stored in the web server 112 that may be a workstation from Sun Microsystems Inc. It is understood to those skilled in the art that the PC 110 can store accessible information therein so as to become a web server as well.

Between the Internet 104 and the airnet 102 there is a link server or proxy server computer 114 for performing data communication therebetween. The proxy server computer 114, also referred to as link server or gateway server computer, may be a workstation or a personal computer that performs mapping or translation functions. For example, the proxy server computer 114 may map information from one protocol to another, such that the mobile device 106 can be in communication with any one of the servers 112 or the PCs 110, respectively.

One communication protocol used on the Internet 104 is the well known HyperText Transfer Protocol (HTTP) or HTTPS, a secure version of HTTP. HTTP uses the well known Transport Control Protocol (TCP) to build a connection for carrying HyperText Markup Language (HTML) information. For example, an HTML Web browser in the proxy server 114 may access HTML information stored in the Web server 112. In the embodiment of FIG. 1, the communication protocol between the mobile device 106 and the proxy server 114 via the airnet 102 is the Handheld Device Transport Protocol (HDTP) or Secure Uplink Gateway Protocol (SUGP) which preferably runs on User Datagram Protocol (UDP). The HDTP controls the connection of a small Web browser in the mobile device 106 to the proxy server 114. In the embodiment of FIG. 1, the browser in the mobile device 106 may be a Handheld Device Markup Language (HDML) browser. The Handheld Device Markup Language (HDML) is similar to HTML in that it is a tag based document language and comprises a set of commands or statements that specify how information is to be displayed on a display device. HDML is a specific markup language designed to specify in a "card" how information should be displayed on a small screen of the mobile device 106. Normally a number of cards are grouped into a deck that is the smallest unit of HDML information that can be exchanged between the mobile device 106 and the proxy server 114. More description on the HDML cards and deck will be described below wherever appropriate. The specifications of HDTP, entitled "HDTP Specification" and HDML, entitled "HDML 2.0 Language Reference" are enclosed and incorporated herein by reference in its entirety.

The HDTP is a session-level protocol that resembles the HTTP but without incurring the overhead thereof and is highly optimized for use in thin devices that have significantly less computing power and memory. Further it is understood to those skilled in the art that the User Datagram Protocol (UDP) does not require a connection to be established between a client device and a server device before information can be exchanged, which eliminates the need of exchanging a large number of packets during a session creation between a client and a server. Exchanging a very small number of packets during a transaction is one of the desired features for a mobile device with very limited computing power and memory to effectively interact with a landline device.

Figure 2:
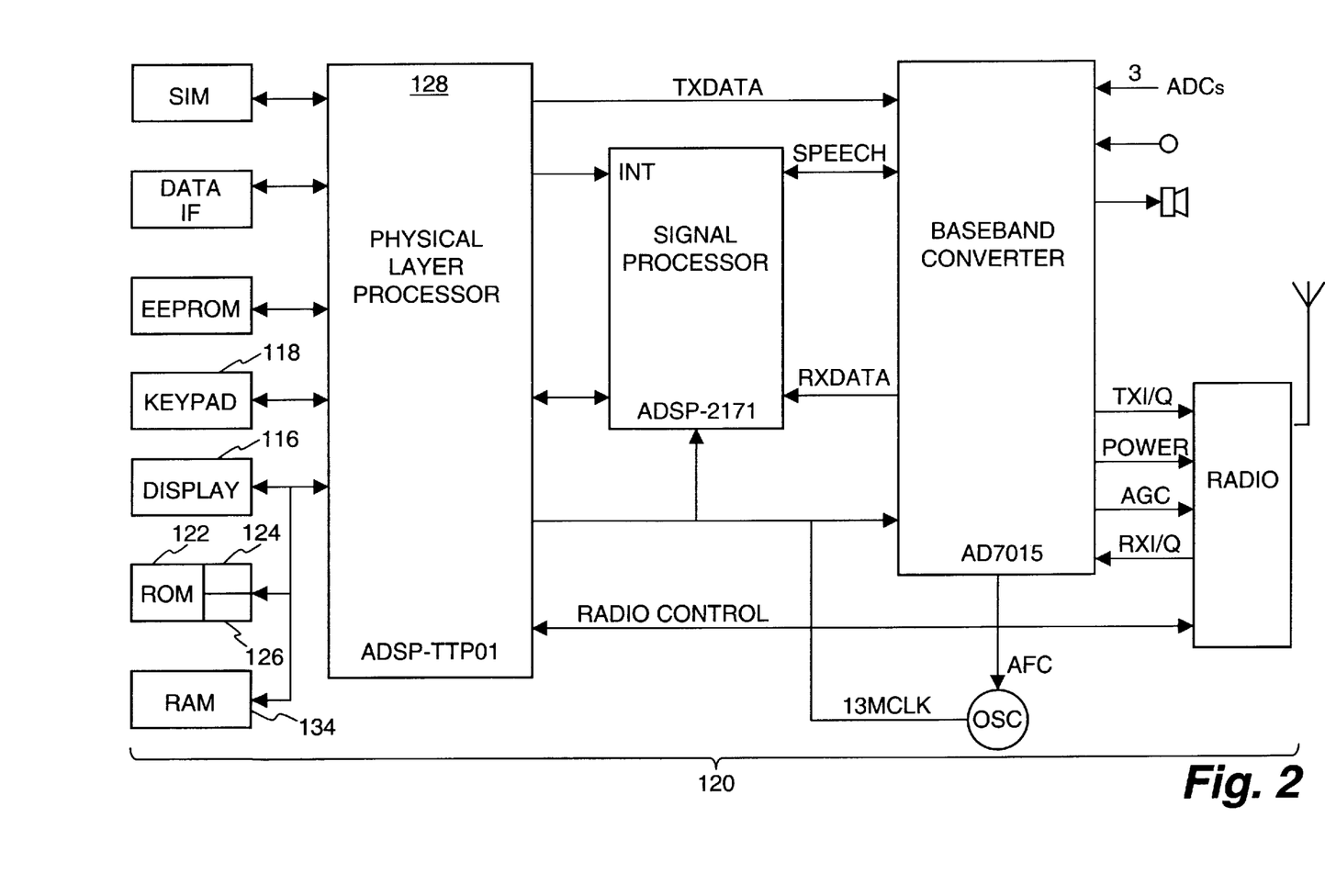
FIG. 2 shows a typical example of a mobile device that includes the linked and compiled processes of the present invention.

Referring now to FIG. 2, there is showed a block diagram of a typical GSM digital mobile phone 120 that can be used in FIG. 1 to practice the present invention. Each of the hardware components in the mobile phone 120 is known to those skilled in the art and so the hardware components are not to be described in detail herein. With the screen 116 and the keypad 118, a user of the phone 120 can interactively communicate with a server device (not shown in FIG. 2) over the data network. According to one embodiment of the present invention, compiled and linked processes of the present invention are stored in ROM 122 as a client module 124 and support module 126. Upon activation of a predetermined key sequence utilizing the keypad 118, a physical layer processor or microcontroller 128 initiates a communication session request to a server device (not shown) using the client module 124 in the ROM 122. Upon establishing the communication session, the phone 120 typically receives a single HDML deck from the server device and stores the deck as cached in RAM 134. An HDML deck or deck is the smallest unit of HDML information that can be exchanged between a thin client device and a server device. Each deck has a unique address identifier such as a URL and includes one or more cards. A card includes the information required to generate a screen display on the display screen 116. Thus, a deck is simply a group of screen displays. The number of cards in a card deck is selected to facilitate efficient use of the resources in the mobile device and in the airnet network. A display driver 130 receives and interprets information from the deck in the RAM 134 and causes the screen 116 to display the information accordingly. The keypad driver 132 receives signals representing what buttons or keys in the keypad 118 are depressed and converts the signals to a representation understood by the microcontroller 128 that in turn responds, for example, by activating a respective card in the deck or a new link to the server for a new deck if necessary depending on what choice is made through the phone keypad 118.

Figure 3:
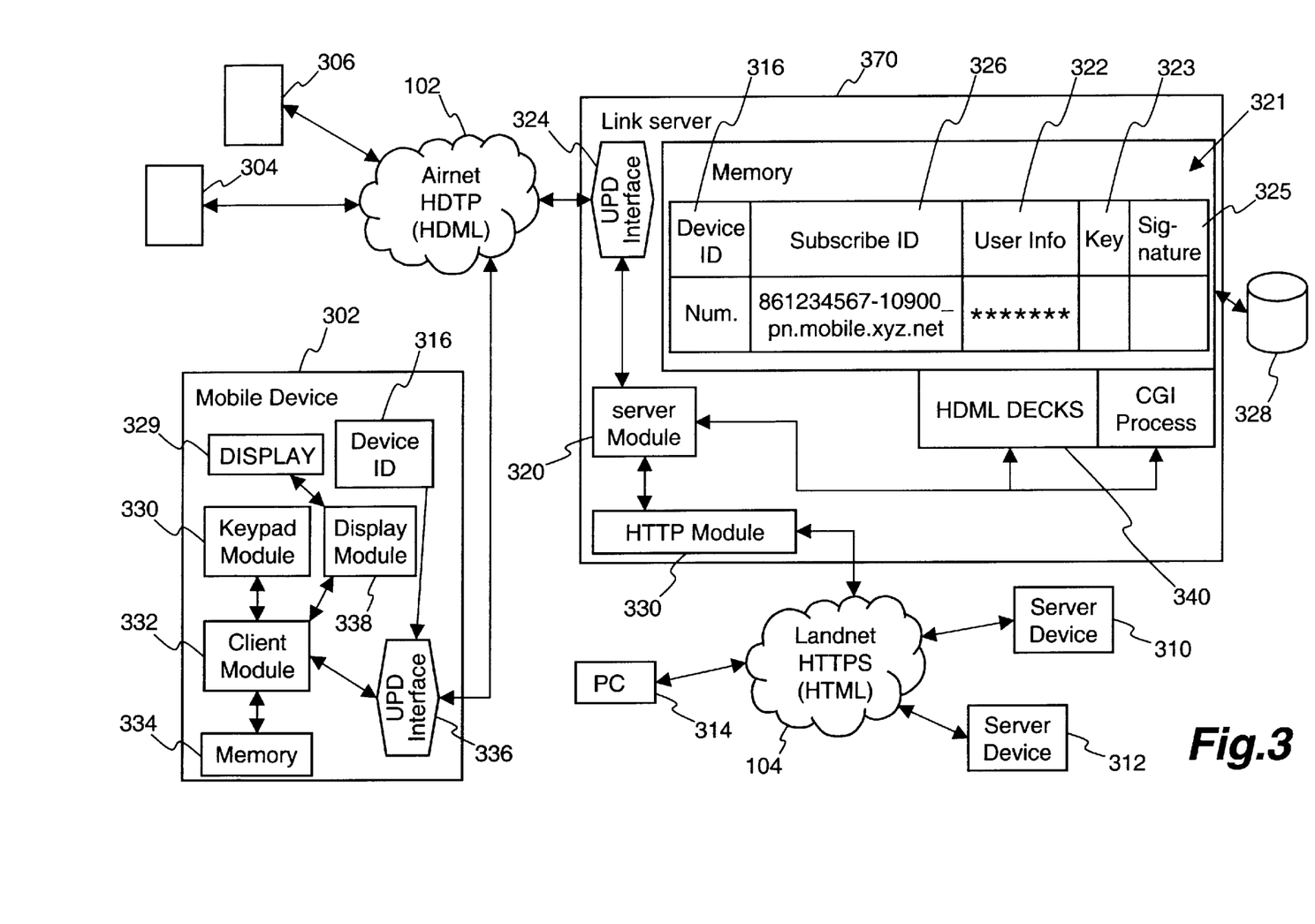
FIG. 3 illustrates the architecture of the present invention.

Referring now to FIG. 3, there is depicted the architecture of the present invention. Referenced by 302, 304 and 306 are three representatives of a plurality of the mobile devices coupled to the airnet 102, similarly referenced by 310, 312 and 314 are three representatives of a plurality of landline devices coupled to the landnet 104. The link server device 370 couples the airnet 102 to the landnet 104, therefore any mobile devices can communicate with the landline devices via the airnet 102 through the link server 370 to the landnet 104. It is understood to those skilled in the art that the mobile devices may be the one shown in FIG. 2. To facilitate the description of the present invention, the internal block diagrams of the mobile device 302 and the link server 370 are respectively illustrated. Other processes and hardware are known to those skilled in the art and are not illustrated in detail in the figure for clarity.

Each of the mobile devices, such as the one 302, is assigned to a device ID 316. The device ID 316 can be a phone number of the device or a combination of an IP address and a port number, for example: 204.163.165.132:01905 where 204.163.165.132 is the IP address and 01905 is the port number. The device ID 316 is further associated with a subscriber ID 318 authorized by a carrier in the link server 370 as part of the procedures to activate a subscriber account 320 for the mobile device 302. The subscriber ID 318 may take the form of, for example, 861234567-10900_pn.mobile.att.net by AT&T Wireless Service, it is a unique identification to the mobile device 302. In other words, each of the mobile devices 302, 304 and 306 has a unique device ID that corresponds to a respective user account in the link server device 370. The following description is focused on the mobile device 302 and the associated account 320, it will be appreciated by those skilled in the art that the description is equally applied to a plurality of the mobile devices in communication simultaneously with the link server 370.

The subscriber account 320, indexed by the device ID 316, is a data structure comprising the subscriber information such as a subscriber number 318, user info 322, key state 321 and a signature 325. The user info 322 may include the account configuration and other account related information, such as username, a URL, a device version and date. The key state 321 indicates the state of a shared secret key. The signature 325 is a result generated from the shared secret key by using the symmetric encryption algorithms such as RC5. When the account is newly established, the key state 321 is set to "Exchange" and no signature is available in the signature 325. More on the key state and signature will be described below. The URL of the account may take the form of, for example, www.att.com/Pocketnet, which indicates that the airnet 102 is operated by AT&T wireless service. It can be appreciated that when the link server 370 provides services to a number of mobile devices, there will be the same number of such accounts, preferably kept in a database server 328, each of the accounts designated respectively to one of the mobile devices.

It should be noted that the database server 328 is not necessary in the present invention. The database server 328, providing means for storing the accounts, may be a separate computer or a memory storage in the link server 370. It is further understood that the link server 370 is one of the landline devices, any of the landline devices can function as the link server 370 and be either a client device or a server device depending on what applications being used in the devices. To minimize possible ambiguities in the following description, the mobile device shall be referred to as the client device or thin client device hereafter and the link server 370 shall be simply referred to as the server device.

As described above, the compiled and linked processes of the present invention are stored in a memory as the client module 332 in the client device 302. Similarly a corresponding compiled and linked processes of the present invention are loaded in a memory as the server module 320 in the server device 370. The communication between the client device 302 and the server device 370 is conducted between the client module 332 and the server module 320 via a pair of User Datagram Protocol (UDP) interfaces 336 and 324. When a user of the client device 302 presses a predetermined key to interact with the server device 370, for example, to fetch price information on a particular stock, the client module 332 sends a corresponding request in form of the HDML deck to the UDP interface 336 which further transmits the request to the counterpart UDP interface 324 in the server device 370. The request is processed by the link server 370 and may result in a further connection to another server device 310 or 312 on the Internet if the link server 370 does not host the stock price information. Nevertheless the stock price information is eventually packed into one or more cards in an HDML deck at 340. The HDML deck is sent back by the server module 320 to the client 302 through the UDP interfaces 336 and 324. With the received HDML deck, preferably cached in a RAM, the client module displays the card or cards on the display screen of the client device 302. If the information exchanging between the client device 302 and the link server device 370 needs to be secret, then a secure communication using encryption/decryption technique must be established on both sides before any secret information can be exchanged.

Figure 4:
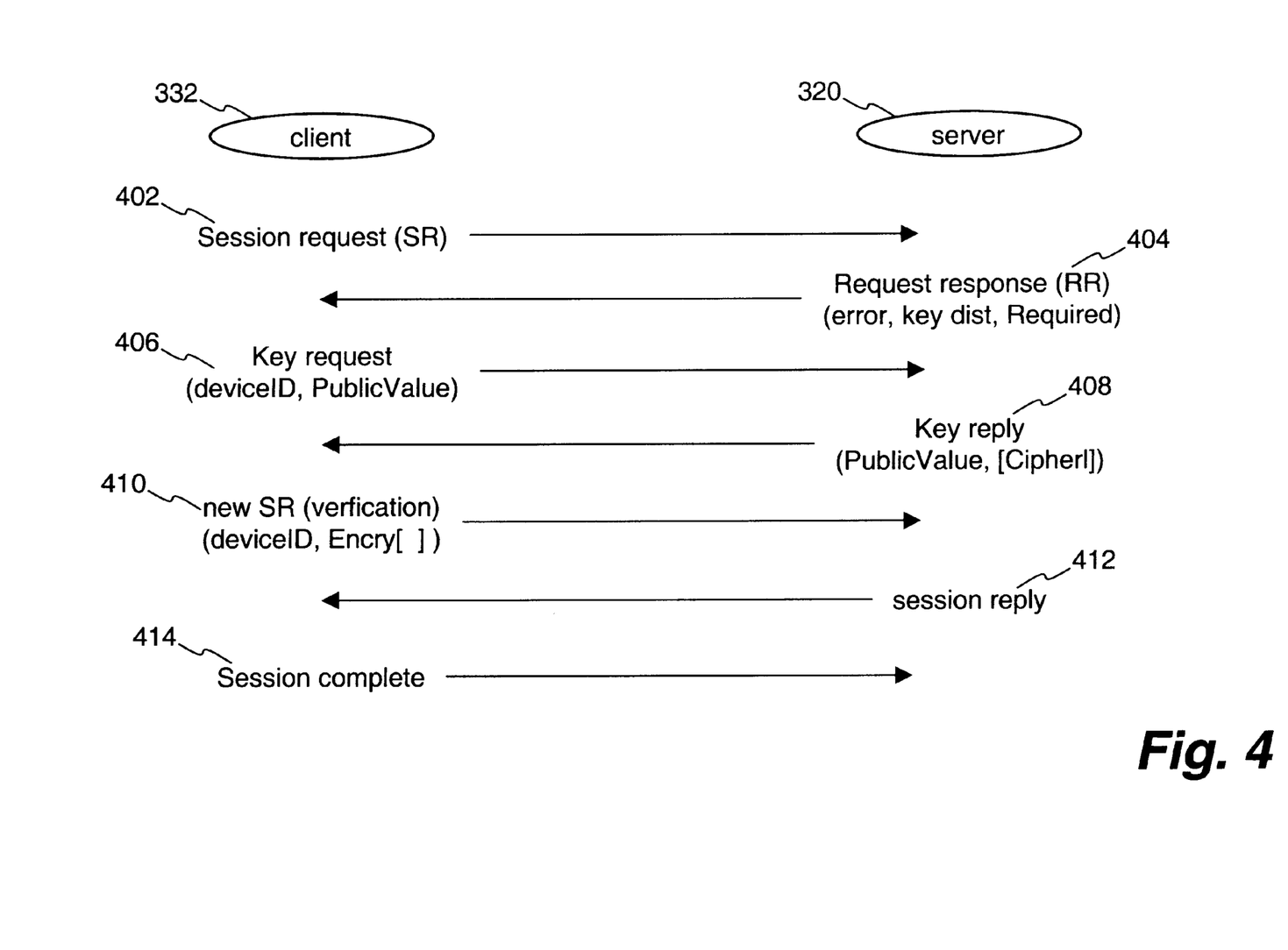
FIG. 4 demonstrates interactions between a client module and a server module through a pair of respective UDP interfaces when the crypto-ignition process is being conducted between a client device and a server device.

Referring now to FIG. 4, there is demonstrated interactions between the client module 332 and the server module 320 through the pair of respective UDP interfaces when the crypto-ignition process is being conducted between the client device 302 and the link server device 370. When the client device 302 is instructed by the user thereof to interact with the link server device 370, the client module 332 sends a session request signal 402 (SR 402) to the server module 320 to create a communication session between the client device 302 and the link server device 370. The signal components in SR 402 depend on the status of the client device 302 and generally comprise:

- sessionID—an identifier identifying all requests from the client device 302 to the link server device 370; In the case of requesting a session to be created, sessionID is always assigned to 0;
- cipher—a two-byte number representing the choice of the encryption the client is currently using as there are a number of encryption schemes available in a communication protocol;
- version—a one byte number representing the HDTP protocol version in use, used to determine the underlying format of the communication protocol such as PDU;
- type—either a fixed five-byte number representing what device the client is, e.g. 2PCSI means the client is a PCSI phone version 2.
- deviceID—a variable up to 255-byte, representing the device identifier or the client identifier;
- header—up to 32767 bytes, comprising token/value pairs that apply to an entire session and may be automatically applied to subsequent service requests or session specific parameters, therefor the header is generally cached in the server till the current session completes; and
- C-nonce—a client nonce represented with a non-repeatable number, usually 2 bytes, used for the client to conduct a following server authentication.
- C-nonceModified—a modified version of the client nonce, used for the server to conduct a nonce verification in the following client authentication.

To be more specific, the cipher in SR 402 includes an identifier to a particular encryption algorithm and associated parameters thereof, namely the first byte in the cipher represents the identifier to a combination of the encryption algorithm, the key size (e.g. 128-bit for US or 40-bit for foreign countries) and content of a security attachment thereto and the second byte in the cipher indicates the additional parameters related to the first byte. For example, value 1 in the first byte indicates that the encryption algorithm is a block cipher RC5, the key size thereof is 128 bit, a two byte check-sum therein is used as Message Authentication Code (MAC), no Initialization Vector (IV) for block ciphers therefor is transmitted over the network, and padding bytes are added if necessary. Information about block ciphers and the various available encryption algorithms can be found in almost any book on contemporary cryptography or M. J. B. Robshaw, "Block Ciphers", Technical Report TR-601, version 2.0, RSA Laboratories, 100 Marine Parkway, Redwood City, Calif. 94065-1031, August 1995. It can be further appreciated that the identifier in the cipher may be assigned to a unique value to identify a non-secure session if so desired. The C-nonce is a non-repeatable number initially and randomly generated in the client and the modified version thereof, C-nonceModified, is generated from the C-nonce through a operational relationship For example, the C-nonceModified may be generated using an Exclusive-OR relationship($\oplus$) that may be expressed as follows:

$$\text{C-nonceModified} = \text{2-byte-number} \oplus \text{C-nonce}.$$

Both C-nonce and C-nonceModified are encrypted by the cipher using a secret encryption key possessed by the client device 302. The purpose of the C-nonceModified is to provide the server that receives the SR with means for ensuring that C-nonce is correctly decrypted and validated by examining the C-nonce and its relationship with the C-nonceModified. If the server device 370 has a valid secret key that is identical to the one in the client device 302, the encrypted C-nonce and C-nonceModified should be decrypted by the valid secret key and the relationship therebetween remains the same. In other words, a SR message 402 may be expressed as follows:

SR={session ID, cipher, version, type, device ID, header, Encry [C-nonce, C-nonceModified]}; where Encry[ ] means that the parameters or contents in the bracket are encrypted accordingly.

The server module 320 attempts to decrypt Encry[C-nonce, C-nonceModified] when SR 402 is received. From the decrypting process, the server device 370 can determine the state of the secret keys on both sides. There are four possible secret key states, "Valid", "Verify", "Exchange" and "Force". The "Valid" key state, resulting from a successful decryption of the encrypted message in SR 402, means that the pair of the secret keys on both sides are identical, hence each, the client device 302 or the server device 370, possesses a shared secret key (SSK) and a new crypto-ignition process is not needed. The "Verify" state indicates that the SSK generated by a new crypto-ignition process has not been verified, it must be followed by a verification process. The "Exchange" key state indicates that the crypto ignition process is allowed at any time at a request by the client device 302, this is usually the case when the user account of the client device 302 is newly established. The "Force" key state indicates that the crypto-ignition process must be conducted before any new session can be created. The "Force" state may be entered as a result from a complete failure of decrypting the encrypted message in SR 402.

When the client device 302 is newly activated and powered on, the key state is automatically set to "Exchange" by default. The key request 406 is then sent to the server device 370 for a crypto-ignition process to start. The C-nonce and C-nonceModified in SR are not encrypted, which results in errors when the server module 320 tries to decrypt Encry [C-nonce, C-nonceModified]. The server sends to the client 332 a Request Response 404 with the errors indicating that the communication session can not be established without first conducting the crypto-ignition process.

The crypto-ignition process is always initiated by sending the key request 406 by the client device 302 to the server device 370 if the key state is either Exchange or Force. Nevertheless the process can also be started if the server device 370 initiates and the client device 302 agrees to proceed with the crypto-ignition process. This may occur when the current SSK expires. A SSK has limited lifetimes for a number of reasons. The most important reason is protection against what is called cryptanalysis. Each time the SKK key is used, it generates a number of ciphertexts. Using a key repetitively allows an attacker to build up a store of ciphertexts (and possibly plain texts) which may prove sufficient for a successful cryptanalysis of the key value. Other instances of the server initiated crypto-ignition process include mismatch between two SSKs on each side. The crypto-ignition process in the client device may be initiated by a session request response (SRR) 404 sent from the server module 320 to the client module 322. SRR 404 comprises a key error message due to the expiration or mismatch of the SSKs on both sides.

Before the client device 302 sends out the key request 406, the client module 332 generates a private value, referred to as the client private value, from a random number. A random number generator normally takes in a random number seed. It is understood to those skilled in the art that there are many random number generators available, such as the rand( ) function available in standard C libraries. Furthermore, there are many ways to get a random number seed such as examining a noise signal off the antenna, a hard coded-in source or provided by the client device manufacturer. With the random number seed, the client private value is then generated by the random number generator that may be a one-way hash function as its core engine. The one-way means that it is significantly easier to perform in one direction (the forward direction) than in the opposite direction (the inverse direction), which makes it unlikely to derive the random number seed from the random number generated. One example of the hash functions is to multiply a value itself a certain number of times and followed by a modulo operation. The client private value generally takes the form of a 16 byte long binary number. The client private value is so generated and sufficiently large enough that it is unlikely to statistically duplicate the client private value based on trying all possible random numbers. The generated client private value is then used as an input to generate a public value, referred to as the client public value according to a key agreement protocol, such as the Diffie-Hellman key agreement protocol. The client public value is often a 96 byte binary number for communications within US and a 64 byte binary number for communications outside US. According to one embodiment of the present invention, a library called LIBDH is used to generate the client public value. The LIBDH is part of the product, called BSAFE, that is a general purpose and low-level cryptographic toolkit from RSA Laboratories having a business of 100 Marine Parkway, Suite 500, Redwood City, Calif. 94065-1031. The engine comprises the Diffie-Hellman key agreement protocol, the ciphers and hashing functions. The client private value is retained within the client device 302 and the client public value is to be transmitted to the server device 370. The client module then sends a key request signal 406 to the server device 370. The key request 406 comprises the device ID 316 of the client device 302 and the generated client public value.

The crypto-ignition process in the server device 370 starts when receiving the key request 406 from the client device 302. As described above, the key request 406 from the client device 302 may result from the error message sent from the server device 370 or a manual request by the user of the client device. Upon receiving the key request 406 from the client device 302, the server device 370 proceeds with the crypto-ignition process, after performing a series of authentication processes based on the device ID 326, by generating a private value, referred to as the server private value. Similar to the client private and public values, the server private value is generated from a random number seed that can be produced from a noise source such as a noisy diode or traffic events in the server device 370. The private value is also a 16 byte long binary number. With the server private value as an input, a public value, or server public value, also a 96 or 64 byte binary number, is generated therefrom using the library LIBDH.

As described above, the Diffie-Hellman key agreement protocol requires two numbers to generate a secret key. The server module 320 uses the client public value in the received key request signal 406 along with the self-generated server private value to generate a server-side secret key based on the Diffie-Hellman key agreement protocol provided in LIBDH. To assist the client device 302 to generate a client-side secret key, the server 370 sends a key reply signal 408 that comprises the server public value. Similarly, based on the received server public value and self-generated client private value, the client module 332 generates a client-side secret key based on the same key agreement protocol provided in LIBDH. As described above, the client-side secret key must be the same as the server-side secret key, referred to as shared secret key (SSK) under normal circumstances. To ensure that the secret keys are identical and that the public values have not been altered in transit in the open data network by the middleman attacks, a two-step verification process is followed.

The first step is to send a new SR 410 by the client module 332 to the server device 370. The components C-nonce and C-nonceModified in the new SR 410 are now encrypted by the newly generated client-side secret key. Upon receiving the new SR 410, the server module 320 tries to decrypt Encry[C-nonce, C-nonceModified] using the newly generated server-side secret key. If the decryption is successful, that means the secret keys on both sides are identical with the assumption that there is no middle-man attacks when the public values are exchanged in the data networks. The secret key can be regarded as the valid shared secret key (SSK) and is committed in server's persistent storage. That SSK is subject to further verification as defined as the second step. If the decryption fails, that means the secret keys on both sides are not the same, which could result from the possible data corruption of public values when they are transmitted over the data networks such as Airnet 102. A new crypto-ignition process may be restarted by sending another request response 404 including the error message to the client device 302, which indicates that the crypto ignition process is failed and another new crypto ignition process can be restarted.

The second step is to examine signatures resulted from both secret keys. A secret key is a 16 byte binary number. The first 8 bytes are used as data to be encrypted by the second 8 bytes as the encryption key according to a mutually agreed cipher, for example, the block cipher RC5 in the RCA engine, the encrypted result is referred to as the signature of the secret key. The signature may take the form of, for example, FE63 ABCD 47FA 3DA3. If the public values have not been altered, the secret keys on both sides will be the same, hence the signatures. The use of signatures provides a means for direct verification between the client side and the server side. For example, the user of the client device may call the operator of the service device to verify if there is a match between the two signatures respectively resulted from the client secret key and the server secret key. If the signatures are identical, it indicates that there was no middleman attack, otherwise the crypto-ignition process is considered failed.

To reduce the air traffic, the step one verification process is piggybacked with a new session to be created. In other words, the verification process is started by the client device 302 by sending a new session request to the server device 370. If the verification succeeds, namely, the encryption keys on both sides are identical, the new session will be continued with a series of authentication between the client device 302 and the server device 370 through the session reply 412 and the complete message 414. A secure and authenticated communication session is thereby established.

The code listing in the appended microfiche is one embodiment of the present invention. Source files Session-Txn.c and netsugp.c describe all detailed steps and procedures of the crypto-ignition process in the server device 370 and the client device 320 respectively. A function named KeyExchInit( ) in the netsugp.c performs the initialization for the crypto-ignition process by starting KeyExchangeDoPhaseOne( ) function which first allocates a memory area to perform the key exchange protocol through DHInit( ) function. A random number is obtained from DevGetRandom( ) function and is to be used in DHPhaseOne( ) function as the client private value. DHPhaseOne( ) generates the client public values for the client device 332. In netSetupKeyExch( ) function, the public value is put into function KeyRequest PDU through SugpKeyRqstSetKeyData( ) function. The constructed KeyRequest PDU is then sent to the server through DevSendPDU( ) function in netDoTxn( ) function.

The crypto-ignition process starts in the function TsessionTxn::Ignition in SessionTxn.c when a KeyRequest PDU is received by the server module 320 from the client device 302. The server device 302 is set by function to CIgnition to start the process, creates a proto-session, pulling out the corresponding record 321 out of the database 328. The server device 370 then verifies if the client device 302 is registered or disabled temporarily, and if the crypto-ignition is allowed. If any one of those conditions are not met, the crypto-ignition process will be aborted and an error code is sent from the server device 370 to the client device 302.

When all those conditions are satisfied, the server module 320 creates an instance object of the TkeyAgree, keyagree, for the client device 302 that sends the KeyRequest PDU. The server module 320 operates on the keyagree object with operations such as Init( ), PubKeyGen( ), GetSSKey( ), and IsWeakKey( ). Init( ) operation initializes the calculation for the key agreement protocol; PubKeyGen( ) generates the public value and the private value through the key agreement protocol and the random number generator; PubKeyGen( ) is internally linked with a random number engine, from which the server private value is generated; GetSSKey( ) calculates the server-side secret key with inputs of the client public value in the KeyRequest PDU from the client device 302 and the private value of its own. IsWeakKey( ) checks if the generated server-side secret key can be safely used as an encryption key. If not, the above process will be repeated until a good server-side secret key is found. Function CmaxKeyTries controls the iterations before the server module 320 gives up and subsequently sends an error message to the client. Upon receiving the error message, the client device 302 sends another KeyRequest PDU to repeat the whole process until a good server-side secret key is generated to the server's satisfaction in CmaxKeyTries.

The server device 370 then delivers the server public value to the client device 302 in KeyReply PDU for the client device 302 to complete the crypto ignition process by using m_rAirlink->Deliver( ) function. Meanwhile the server device 370 saves the server-side secret key in m_pNewCipher and wait for the client device 302 to initiate the verification process that commits the server-side secret key to the SSK that is then loaded into the persistent database through a new session creation request from the client device 302.

In netsugp.c, namely the client side, KeyReply PDU is received through the function NetDataArrived( ) function, and is passed into netHandleKeyRply( ) function. The server public value in KeyReply PDU from the server is extracted and is fed into KeyExchDoPhaseTwo( ) function to generate the client-side secret key. After the client-side secret key is successfully generated, the client module 332 saves it into its persistence storage and clears its needs for crypto-ignition request by calling ClearNeeds(kKeyExch) function. To verify both secret keys generated respectively in the client device 302 and the server device 370, the client device 302 then makes a new session request to create a new session by using the newly generated client-side secret key to encrypt C-nonce and C-nonceModified in the SessionRequest PDU, which can be observed in the function netSetupSess( ) function. The SessionRequest PDU is sent from the client device 302 to the server device 370.

In SessionTxn.C, when the SessionRequest PDU is received by the server device 370, the server module 320 calls TSessionTxn::Start( ) to process the request. As far as the crypto-ignition process is concerned, a successful decryption on the coming SessionRequest PDU by using the newly generated server-side secret key will commit the server-side secret key to the SSK that is then loaded into its persistent database. In the same function, the server module 320 checks if there is a pending crypto-ignition process by checking if m_pNewCipher exists. If so, it is used to decrypt the SessionRequest PDU. If the decryption is successful, the server saves the server-side secret key as the shared secret key by using the functions m_rSession->m_pSubscriber->SetKey( ) and m_rSession->m pSubscriber->ExchangeComplete( ). The signature is also taken and saved at that point by using m_pNewCipher->MakeSignature( ) function. This completes the crypto-ignition process in the server 370.

Figure 5A:
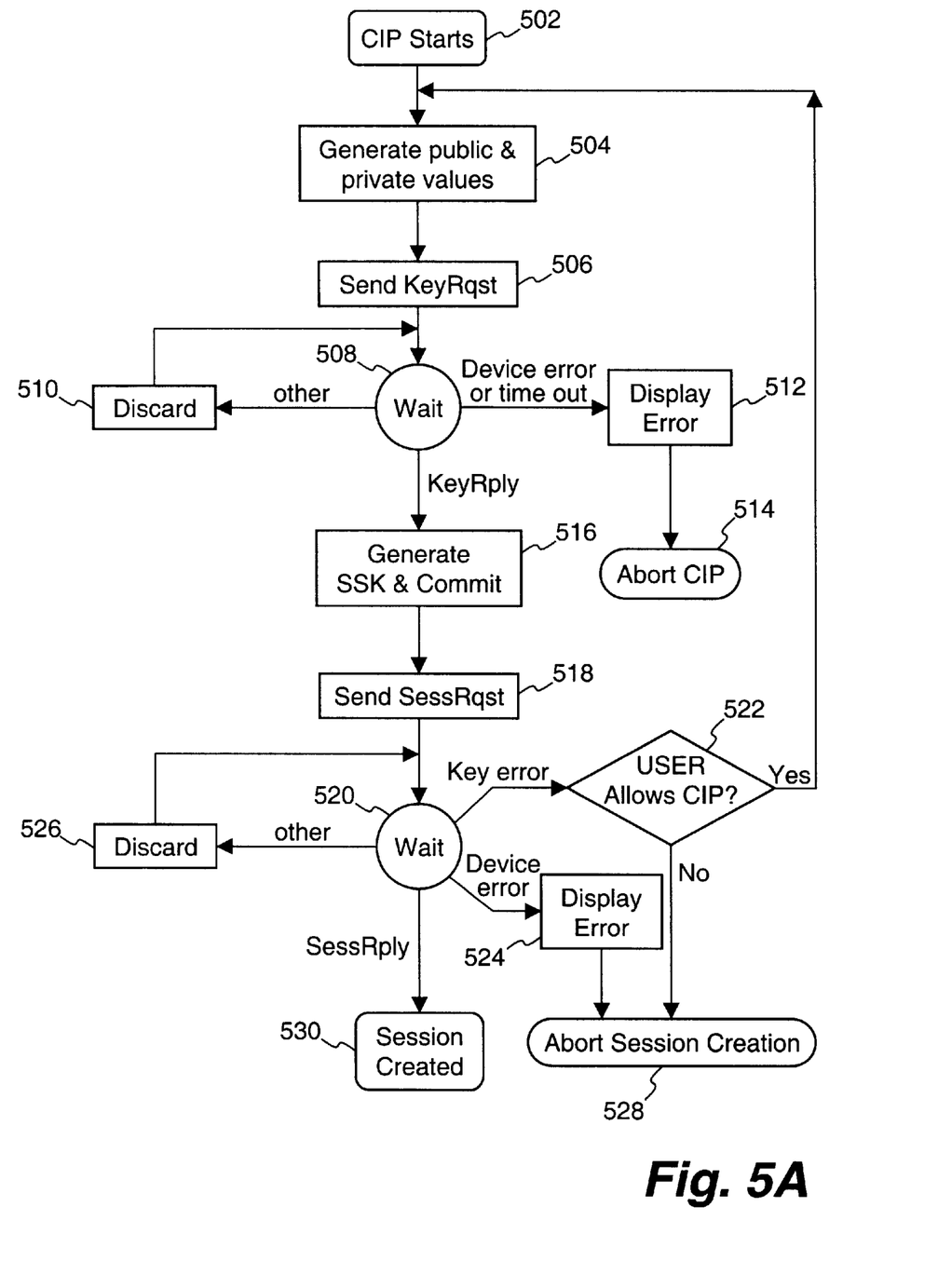
FIG. 5A and FIG. 5B depict a data flowchart representing the crypto-ignition process being conducted between a client device and a server device.
Figure 5B:
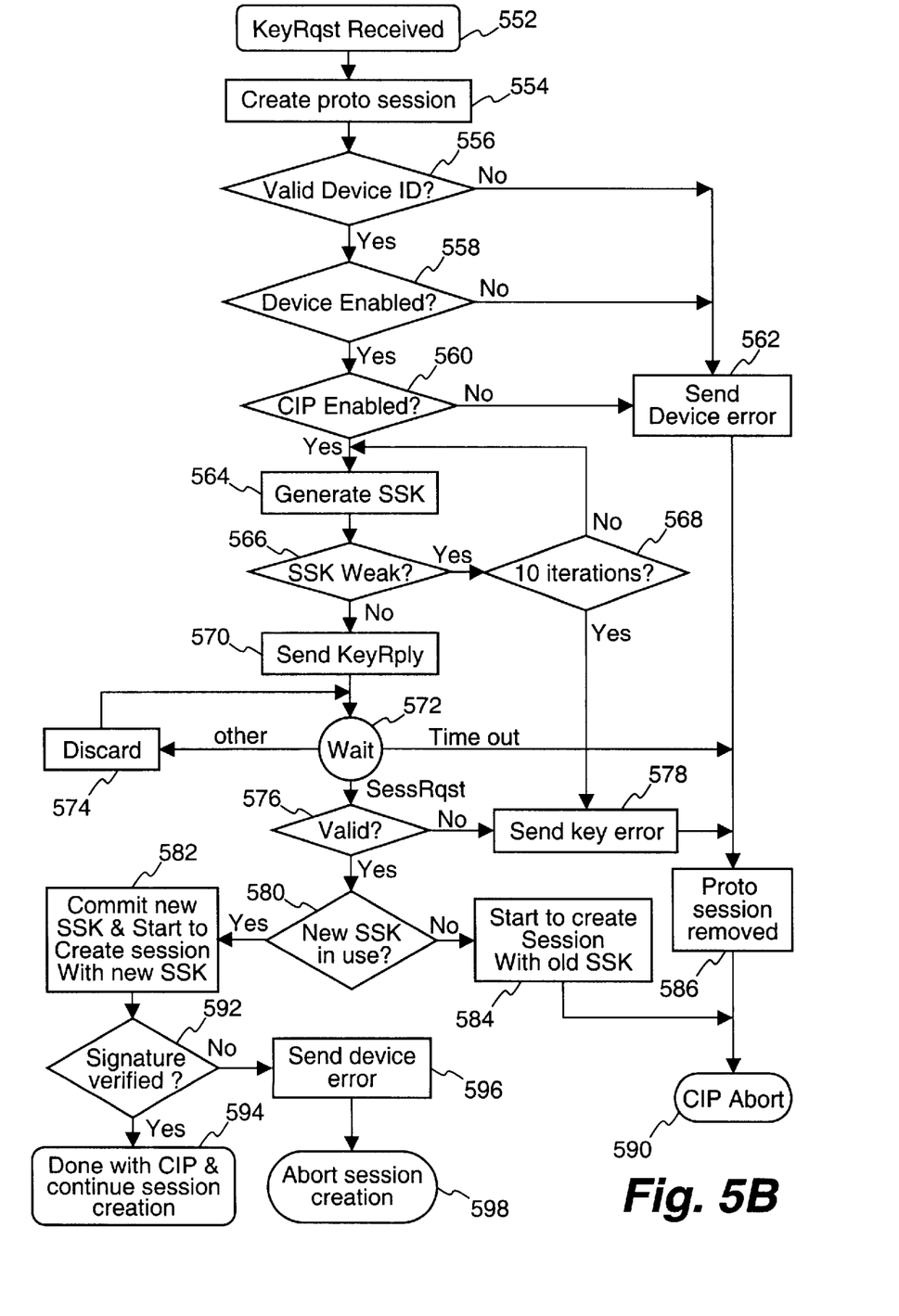

Referring now to FIGS. 5A and 5B, there are shown data flowcharts of the crypto-ignition process (CIP) respectively in the client device 302 and the server device 370. Both FIGS. 5A and 5B should be understood in conjunction with FIGS. 3 and 4. As described above, the crypto-ignition process may be started in several ways of which one is to initiate the process by manually requesting a new crypto-ignition process to be conducted between the client device 302 and the server device 370. A second way is from the error message in the session request response 404 sent by the server device 370 due to, for example, complete failure of decrypting the SR 402, the expiration or mismatch of the SSKs on both sides.

The client device starts the crypto-ignition process (CIP) at 502 in FIG. 5A. At step 504, the client module generates the client private value followed by generating the client public value, the processes thereof have been described above. When the client public value becomes available, the client module sends a key request signal 406 to the server module at step 506. The client device starts waiting for a key reply 408 from the server device at step 508. While waiting for the key reply 408, the client device may receive signals other than the desired key reply 408 from the intended server device. If the received signals are not the desired key reply 408, they are discarded at step 510. To prevent the client device to wait indefinitely, a time limit is placed upon the waiting, for example, 60 seconds. Within the time limit, the desired key reply 408 must be received otherwise an error message is displayed on the display screen of the client device at step 512 to inform the user thereof that the current crypto-ignition is aborted at step 514.

Referring now to FIG. 5B, upon receiving key request signal 406 at step 552 from a client device, the server module creates a server proto session at step 554 for the client device with a session identifier, referred to as session ID, to identify the session requested by the client device to be created with the server. A server proto-session is a session entry marked as a proto status in a session table, which indicates that the session is not authenticated and is not able to conduct any transactions with the client. It is understood to those skilled in the art that the proto-session can be kept in the RAM of the server and there could be more than one proto-sessions if the server device is in communication with other client devices. If a proto-session already exists for the particular client device, it is re-used. The information in the received SR is saved in the proto-session. To ensure that the server module communicates with an authorized client device, the server device conducts a series of verifications. At 556, the server device first examines if the device ID in received SR 402 is valid by comparing the received ID with the device ID assigned in the account. If the received device ID is valid, the server module further examines if the client device is enabled at 558. Sometimes a client device may have a valid device ID but the client device is disabled for certain reasons. When the client device is recognized and authorized with the server device, the server module examines if the crypto-ignition process is enabled by examining the key state in the user account. As described, the key state is set to "Exchange" when the user account is newly established. The states that allow the crypto-ignition process are the "Exchange" and "Force", which considers the current crypto-ignition process is enabled; otherwise, it is not enabled.

If any one of the verifications at steps 556, 558 or 560, fails then the server module will send a device error at 562 to inform the client that the attempted CIP has been aborted. The server then removes the created proto session for this particular session at step 586 and aborts the CIP at step 590.

When all the verifications at steps 556, 558 and 560 succeed, the server module proceeds with generating the server private value and the server public value, the procedures of which have been described above. With the received client public value and the server-self generated private value, the server module generates a server-side secret key according to a commonly key agreement protocol at step 564. For security reasons, the server-side secret key generated at step 564 is put through a key examination process at step 566. The key examination process is to ensure that the generated secret key has a sufficient random pattern and is not easily reproduced by the cryptanalysis. Some of the patterns that may be easily statistically detected are the keys with periodic 0's and 1's, such as 0101010101 . . . 01, which is easily subject to unauthorized duplication. These SSKs are considered weak and should be discarded and regenerated. At step 568, there is a counter to monitor the number of times a generated secret key has to be regenerated. If the counter is greater than a certain number, for example 10, the server device gives up and then sends an error message to the client at 578, requesting the client to start the CIP all over again. If the generated secret or the regenerated secret key passes the key examination process at step 566, the server at step 570 sends a key reply signal with the server public value to the client module and causes the client module to generate a client-side secret key. Similar to the client device, the server module starts waiting for a reply from the client device at step 572. Any unwanted signals will be discarded at 574. If the server module waits for too long, the initially created proto-session will be removed at 586 and the current crypto-ignition process is aborted at 590.

Referring back to FIG. 5A, the client module is waiting for the key reply signal at step 508. The client module generates a client-side secret key at step 516 upon receiving the key reply signal from the server device. Thus, the client module relies upon the server to test for weak SSKs. The client module starts the similar key generating process, using the server public value and the client-self generated private value to generate the client-side secret key according to the commonly used key agreement protocol at 516. From the perspective of the client device, the generated client-side secret key is assumed valid and the client module commits the generated client-side secret key to the SSK by loading it to its persistent memory or RAM. The client then initiates a new session request 410 with Encry[C-nonce, C-nonceModified] by the client generated SSK.

Referring back to FIG. 5B, when server receives the new session request 410 at step 572, the server looks up the proto session entry in the proto session table and performs a series of the verification process using the device ID in the new session request 410 at step 576. When the server module is ensured that the new session request 410 does come from the recognized and authorized client device, it checks if Encry [C-nonce, C-nonceModified] is successfully decrypted by the current server-side secret key, if successful, it indicates that the server-side secret key is a SSK with the client device. The server module commits the server-side secret key to the SSK with the client device by loading it into a persistent memory in the server device at 582. Otherwise, it checks if Encry[C-nonce, C-nonceModified] can be successfully decrypted by the old SSK, that indicates that the client device has failed in the current crypto-ignition process. Then, the current crypto-ignition process is silently aborted (without sending an error message to the client) at 590 and a new session is created with the old SSK. So the process preserves the existing old SSK in case the current crypto-ignition process fails.

To provide a means for verifying the created SSKs, two signatures from the two SSKs are verified at 592. This may be proceeded by a verbal verification between the user of the client device and an operator of the server device. As described above, a signature at the client side can be generated when the client-side secret key is produced. Similarly, a signature at the server side can be generated when the server-side secret key is produced. If the two signatures are not matched, the current crypto-ignition process is failed and no secure communication sessions can be established. If the verification is successful, the current crypto-ignition process succeeds at 594. It should be noted that the verbal verification is not a necessary part of the current invention and used in one embodiment to illustrate that the means for verifying the SSKs by comparing the signatures resulted from the SSKs is provided.

The present invention has been described in sufficient detail with a certain degree of particularity. It is understood to those skilled in the art that the present disclosure of embodiments has been made by way of example only and that numerous changes in the arrangement and combination of parts as well as steps may be resorted without departing from the spirit and scope of the invention as claimed. Accordingly, the scope of the present invention is defined by the appended claims rather than the forgoing description of one embodiment.

What is claimed is:

1. A method for establishing a secure communication channel between a client device and a server device over a data network, the method comprising:
   generating a client private value in said client device;
   generating a client public value based upon said client private value in said client device;
   sending a key request message from said client device to the server device;
   verifying said client device using a user account associated with the client device that is accessible by the server, said user account specifying a key state defining a state of a secret key negotiation;
   transferring said client public value from the client device to the server device;
   generating a server-side secret key using a server private value and said client public value; and
   transferring a server public value from the server device to the client device.

2. The method as recited in claim 1 further comprising:
   generating a client-side secret key in said client device using said client private value and said server public value.

3. The method as recited in claim 2 further comprising:
   conducting a third verification process using an out-of-band communication of signatures.

4. The method as recited in claim 3 further comprising:
   regenerating a server-side secret key if said server-side secret key does not meet a predefined secret key requirement.

5. The method as recited in claim 1 further comprising:
   testing a cryptographic property of said server-side secret key.

6. The method as recited in claim 5 further comprising:
   regenerating a server-side secret key if said server-side secret key does not meet a predefined secret key requirement.

7. The method as recited in claim 1 wherein a key state of "Exchange" causes said client device to send said key request message.

8. The method as recited in claim 1 wherein said sending a key request message and transferring a client public value are performed with a single message.

9. The method as recited in claim 1 wherein the key request message comprises a device ID of the client device.

10. The method as recited in claim 1 wherein verifying said client device comprises ensuring said user account associated with said client device is enabled.

11. The method as recited in claim 1 further comprising:
    creating a proto session for the client device if the said verification succeeds.

12. The method as recited in claim 1 further comprising:
    generating the server public value from said server private value according to a mutually agreed key agreement.

13. The method as recited in claim 2 further comprising generating a server signature from the server-side secret key.

14. The method as recited in claim 13 further comprising generating a client signature from the client-side secret key.

15. The method as recited in claim 14 further comprising:
    comparing the client signature and the server signature; and
    loading to a persistent memory the client-side secret key and the server-side secret key to a pair of shared secret keys if the client signature and the server signature are matched.

16. The method as recited in claim 1 further comprising verifying said server side secret key by:
    initiating a session request by the client device to establish a communication session with the server device;
    wherein the session request comprises the device ID of the client device, an encrypted message by the client-side secret key according to a mutually accepted cipher;
    decrypting the encrypted message by the server device using the server-side secret key; and
    loading the server-side secret key to a proto-session when the encrypted message is successfully decrypted by the server device.

17. A method for establishing a secure communication channel between a client device and a server device over a data network, the method comprising:
    transmitting a secure session request from said client device to said server device over said data network, said secure session request comprising a pair of encrypted values using a client-side secret key, said pair of encrypted values related by a specified function;
    verifying said pair of encrypted values in said secure session request using a server-side secret key in said server device by decrypting said encrypted values and testing if said decrypted values are related by said specified function, verifying said pair of encrypted values comprising substeps of
      decrypting said pair of encrypted values using a new server-side secret key; and
      decrypting said encrypted message using an old server-side secret key if said new server-side secret key fails to decrypt said pair of encrypted values; and
    transmitting a secure session reply to said client device from server device.

18. The method as recited in claim 17 wherein said secure session reply includes a success indication if said pair of encrypted values in said secure session request were successfully verified.

19. The method as recited in claim 17 wherein said secure session reply includes an error indication if said pair of encrypted values in said secure session request were not successfully verified.

20. The method as recited in claim 19 wherein said error indication forces said client device to start a crypto-ignition procedure.

21. The method as recited in claim 20 wherein said crypto-ignition procedure comprises sending a key request message from said client device to said server device, said key request message comprising a client public value.

22. The method as recited in claim 21 wherein said crypto-ignition procedure further comprises generating a server-side secret key based upon said client public value and a server private value.

23. The method as recited in claim 17 further comprising:
    verifying, within said server device, a signature sent from client device to said server device.

24. The method as recited in claim 17 wherein said server device uses said new server-side secret key for a session if said new server-side secret key successfully decrypted said pair of encrypted values and said server device uses said old server-side secret key if said old server-side secret key successfully decrypted said pair of encrypted values.

25. The method as recited in claim 17 wherein said server device transmits a secure session reply containing an error indication if neither said new server-side secret key nor said old server-side secret key successfully decrypts said pair of encrypted values.

* * * * *

UNITED STATES PATENT AND TRADEMARK OFFICE
CERTIFICATE OF CORRECTION

PATENT NO. : 6,263,437 B1
DATED : July 17, 2001
INVENTOR(S) : Liao et al.

It is certified that error appears in the above-identified patent and that said Letters Patent is hereby corrected as shown below:

<u>Title page,</u>
Under Assignee, please replace "Openware Systems Inc" with -- Openwave Systems Inc. --.

Signed and Sealed this

Second Day of April, 2002

*Attest:*

JAMES E. ROGAN
*Director of the United States Patent and Trademark Office*

*Attesting Officer*